United States Patent [19]

Langley

[11] Patent Number: 4,921,607
[45] Date of Patent: * May 1, 1990

[54] FILTER ASSEMBLY FOR MOLTEN POLYMERIC MATERIAL

[75] Inventor: Isaac L. Langley, Greenville, S.C.

[73] Assignee: Hoeganaes Corporation, Riverton, N.J.

[*] Notice: The portion of the term of this patent subsequent to Apr. 28, 2004 has been disclaimed.

[21] Appl. No.: 160,029

[22] Filed: Feb. 25, 1988

[51] Int. Cl.$^5$ .............................................. B01D 29/26
[52] U.S. Cl. .................................... 210/266; 210/289; 210/323.2; 210/503; 210/510.1; 425/199
[58] Field of Search ............ 210/283, 284, 439, 323.2, 210/287, 289, 266, 510.1, 456, 503; 425/197, 198, 199

[56] References Cited

U.S. PATENT DOCUMENTS

| | | | |
|---|---|---|---|
| 3,570,059 | 3/1971 | Mott | 425/192 R |
| 3,896,028 | 7/1975 | Phillips | 210/152 |
| 4,661,249 | 4/1987 | Langley | 210/266 |

Primary Examiner—W. Gary Jones
Assistant Examiner—Matthew O. Savage
Attorney, Agent, or Firm—Woodcock Washburn Kurtz Mackiewicz & Norris

[57] ABSTRACT

The prefilter assembly is provided with a central cavity in which a plurality of tubular porous tubular elements are provided with the remaining space being filled by a mass of shattered metal particles. During filtration, the shattered metal particles eliminate dead space within the filter while also filtering out micro gels which may be in the polymeric material. The shattered metal particles also reduce the possibility of gel formation due to cross-linking of the polymer mass therethrough.

11 Claims, 2 Drawing Sheets

FILTER ASSEMBLY FOR MOLTEN POLYMERIC MATERIAL

This invention relates to a filter assembly for molten polymeric material and, more particularly to a prefilter assembly for molten polymeric material.

Heretofore, various types of filter assemblies have been known for the filtering of molten polymeric material. For example, it has been known to provide filter assemblies in which a plastic material can be forced at elevated pressures into a central cavity and thereafter passed through small extrusion orifices to form fiber strands. In some cases, flat porous filters have been provided in the cavity in order to filter the plastic for extrusion by shearing lumps or inconsistencies in the plastic. In addition, it has been known to fill the cavity behind such porous filters with sand or marbles in order to reduce the effective volume of the cavity which may be filled with plastic. It has also been known from U.S. Pat. No. 3,570,059 to construct a spinnerette head filter with a plurality of tubular filter elements in such a cavity to substantially fill the cavity and provide an increased cross-sectional area for filtering.

However, prefilters of the above type incorporate a certain amount of "dead space". That is, in the case where tubular filter elements are used, for example, the prefilters require some clearance of space for the polymer to flow around the filter elements prior to being filtered. Further, there is additional space required for assembly and disassembly of the filter. Still further, there is space between the media macro structure. All of this "dead space" causes the polymeric material to stagnate which, in some polymers causes the polymer to cross-link forming "gels". These gels are particulates that must be filtered from the polymer, but, depending upon their size, may be too small to be economically removed with conventional media.

U S. Pat. No. 4,661,249 describes a prefilter device employing shattered metal particles for filtering micro-gels from a polymeric material passing therethrough while providing high shear for polymer anomalies. In this respect, the shattered metal particles provide an excellent media for removal of gels and indeed, is the only known media that can remove the "micro-gels" without undue pressure and expensive increase in pressure differential.

Accordingly, it is an object of the invention to eliminate the dead space in a prefilter assembly for molten polymeric material.

It is another object of the invention to avoid cross-linking of a polymer within a prefilter assembly during filtering.

It is another object of the invention to provide a prefilter assembly which can be readily used for filtering gel prone polymers.

Briefly, the invention provides a filter assembly which has a housing defining a cavity for passage of a flow molten polymeric material therethrough, a plurality of tubular porous filter elements mounted within the cavity to receive and filter the polymeric material passing therethrough and a mass of shattered metal particles filling the remainder of the cavity in order to filter micro-gels from the polymeric material passing therethrough prior to passage of the material into the porous filter elements.

In one embodiment, the tubular filter elements may occupy approximately 70% of the free volume of the cavity of the housing while the mass of shattered metal particles occupies all of the remaining volume of the cavity e.g. approximately 30%. In this embodiment, the flow rate of the polymeric material can be accelerated when passing through the shattered metal particles thereby preventing over-exposure of the polymeric material to the heated surfaces of the tubular filter elements. Further, the flow through the shattered metal particles is such that the polymeric material inertially separates particulate during passage through to the tubular filter elements.

The housing may be constructed with an inlet and an outlet which are disposed to fit adjacent equipment. In addition, the housing may include a cylindrical wall defining the cavity, and a plurality of ducts communicating the inlet with a plurality of spaced apart points about the filter bed in order to deliver the polymeric material thereto. A filter may also be provided in the housing between the inlet and the cavity in order to retain the shattered metal and to initially filter the flow of polymeric material. Such a filter may be of tubular construction and be disposed relative to a spiral groove so that the polymeric material is substantially and uniformly distributed about and into the cavity for filtering purposes. The filter assembly may be used as a prefilter assembly or for any other suitable purposes for filtering polymeric material.

The prefilter assembly is such that the shattered metal particles not only remove micro gels from the polymeric material but also significantly eliminate the dead space within the assembly so that stagnation of the polymer and formation of gels by cross linking are not occuring.

The prefilter assembly is particularly suitable for the production of high quality fiber and film using gel prone polymers. In such cases, the use of multiple filtration devices can be eliminated.

These and other objects and advantages of the invention will become more apparent from the following detailed description taken in conjunction with the accompanying drawings wherein.

Figure 1:
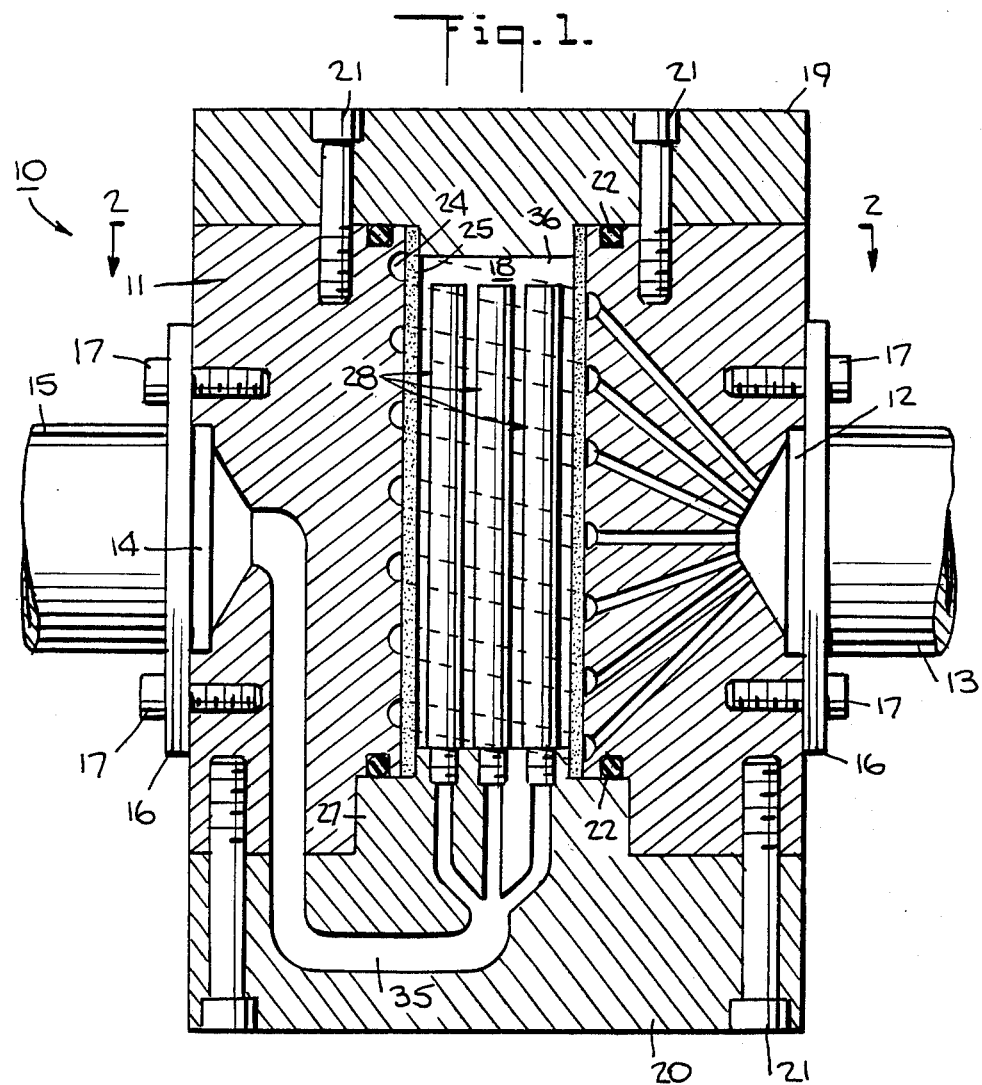
FIG. 1 illustrates a part cross-sectional view of a prefilter assembly constructed in accordance with the invention.

Referring to FIG. 1, the prefilter assembly 10 is constructed so as to be disposed in the flow path of a flow of molten polymeric material passing, e.g. from an extruder. To this end, the prefilter assembly includes a housing 11 having an inlet 12 connected with an inlet conduit 13 and an outlet 14 connected to an outlet conduit 15. As indicated, each conduit 13, 15 is secured to a side wall of the housing 11 by means of a flange 16 on each conduit 13, 15 and a plurality of bolts 17 which pass through the flanges 16 into the side walls of the housing 11. As indicated, the inlet 12 and outlet 13 are disposed to fit adjacent equipment to the housing 11.

In addition, the housing 11 defines a central cavity 18 which communicates with the inlet 12 to receive the flow of polymeric material as well as with the outlet 14 for expelling a filtered flow of polymeric material. Caps 19, 20 are also secured to opposite ends of the housing 11 by means of bolts 21 to close the cavity 18 and annular sealing rings 22 are provided between the housing 11 and the respective caps 19, 20 to seal the cavity 18.

Figure 2:
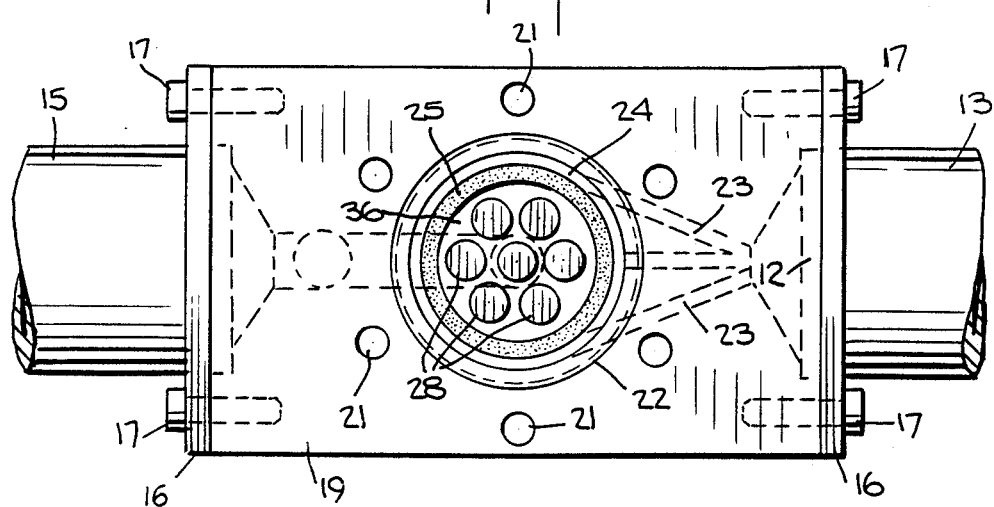
FIG. 2 illustrates a view taken on line 2—2 of FIG. 1.

Referring to FIGS. 1 and 2, the inlet 12 communicates with the cavity 18 via a plurality of ducts 23 and a spiral groove 24 which is formed in a cylindrical wall of the housing 11. As indicated, the ducts 23 are distributed not only longitudinally of the cavity 18 but also circumferentially of the cavity 18. In addition, the ducts 23 terminate at a plurality of spaced apart points of the spiral groove 24. In this way, the polymeric material can be distributed longitudinally and transversely of the cavity 18 in a substantially uniform manner.

Figure 3:
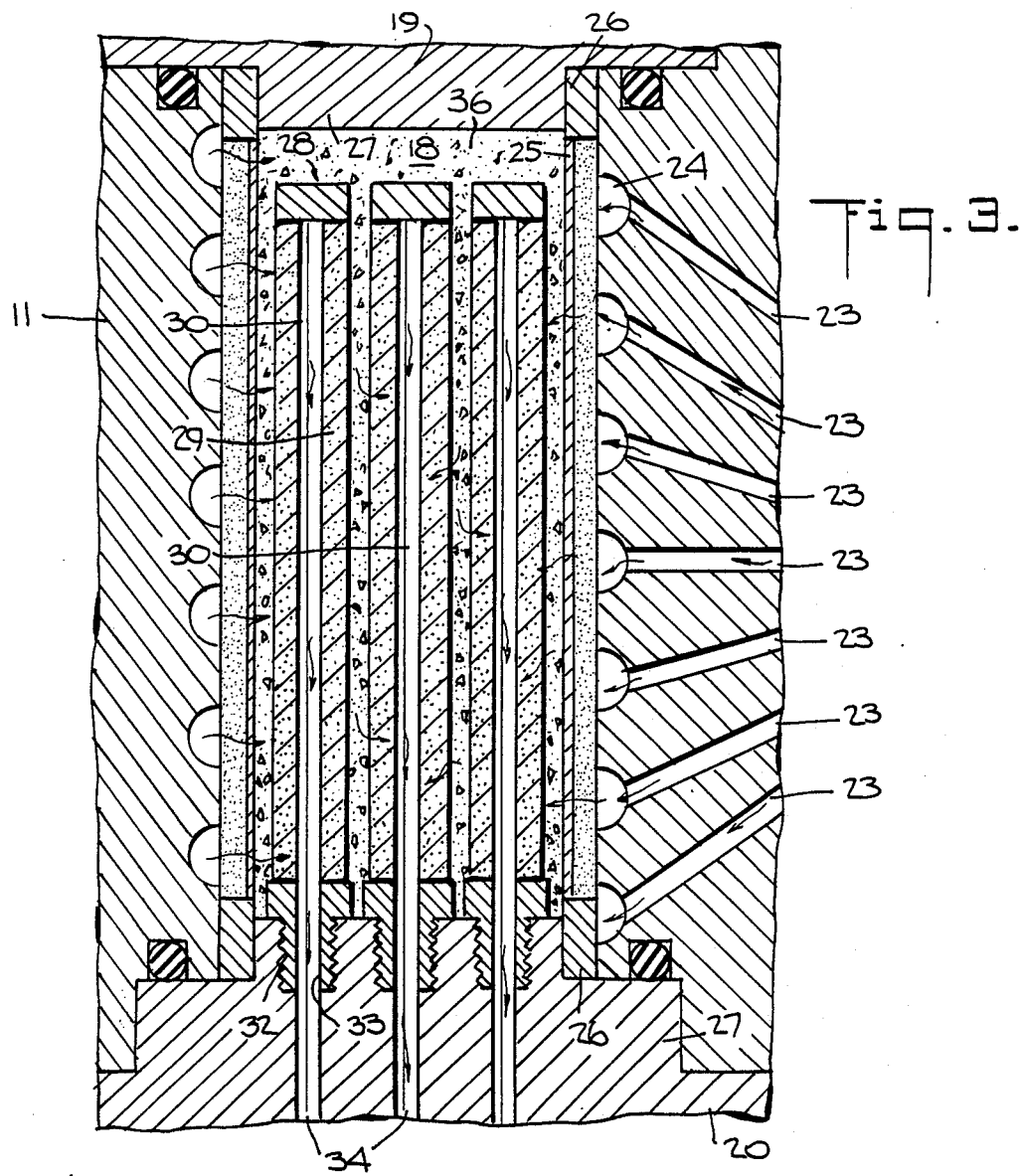
FIG. 3 illustrates an enlarged detail cross-sectional view of the prefilter assembly of FIG. 1.

Referring to FIG. 3, a filter screen 25 of tubular shape is disposed within the cavity 18 in a coaxially concentric manner. This filter 25 is of an outer diameter to slidably engage with the wall of the housing 11 so as to fit inside the spiral groove 24. As such, the filter 25 serves to initially filter the polymeric material passing from the groove 24 into the cavity 18 while at the same time providing for a substantially uniform distribution of the flow of the polymer into the cavity 18. The filter 25 is, for example, an ELTEC filter made of a porous nickel structure. However, the filter 25 can be made of any suitable material with a low pressure drop.

As indicated in FIG. 3, the tubular filter 25 is provided with mounting rings 26 at each end while the caps 19, 20 secured to the housing 11 are provided with raised central portions 27 to fit within the rings 26. In this way, the tubular filter 25 can be firmly held in place under the pressures generated by the flow of polymeric material passing therethrough.

Figure 4:
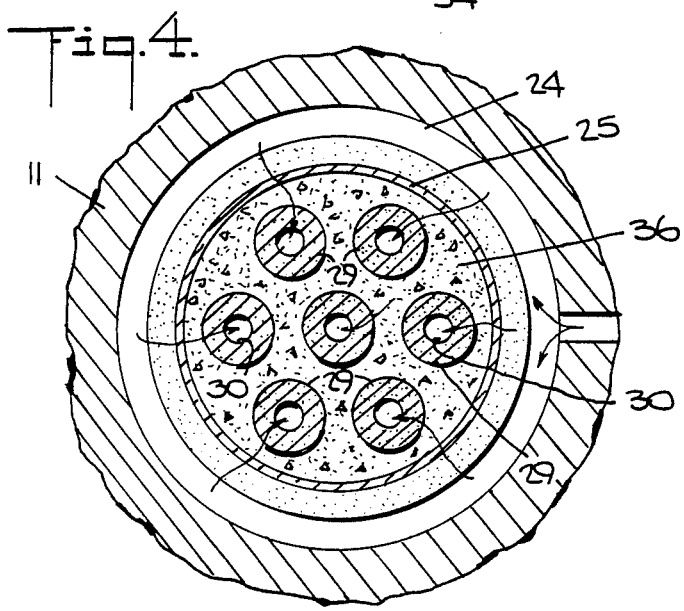
FIG. 4 illustrates an enlarged cross-sectional plan view of the filter media elements of the prefilter assembly of FIG. 1.

Referring to FIGS. 3 and 4, a plurality of tubular porous filter elements 28 are mounted within the cavity 18 to receive and filter the polymeric material passing therethrough. As indicated, each element 28 has a tubular barrel 29 of a tubular porous metal material which defines a passage 30 for conveying the filtered polymeric material, a cap 31 (FIG. 3) for closing one end and a threaded hollow stem 32 at the opposite end. As indicated, each cap 31 may be welded or otherwise secured to the barrel 29 to close off the passage 30. Each threaded stem 32 is threaded into the raised portion 27 of the bottom cap 20, as viewed, and has a bore 33 which provides a continuation for the passage 30. In addition, the bottom cap 20 is provided with a plurality of ducts 34, each of which communicates with the bore 33 of a threaded stem 32 to pass the polymeric material into a common duct 35 (see FIG. 1) leading to the outlet 14.

Figure 5:
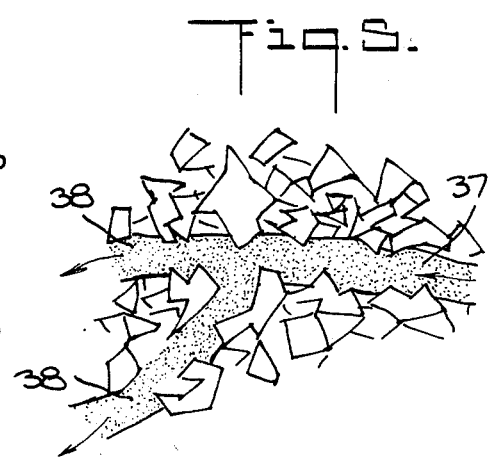
FIG. 5 illustrates a schematic representation of the flow of polymeric material through the shattered metal particles used in the prefilter assembly in accordance with the invention.

Referring to FIG. 3, the central cavity 18 is also filled with a mass 36 of shattered metal particles. As indicated, the mass 36 of shattered metal particles fills the space within the cavity 18 not occupied by the tubular filter elements 28. The shattered metal particles are of a nature as described in U.S. Pat. No. 4,661,249 and serve a similar purpose. In this respect, as indicated in FIG. 5, during operation, polymeric material flows through the shattered metal particles so that individual streams 37 of the polymeric material are broken down into branch steams 38 where due to the shearing action caused by the passage of polymeric material through the individual shattered metal particles, gels which may exist within the individual streams 37 are reduced in size. In addition, any micro-gels in the polymeric material become trapped in the voids within the shattered metal particle mass due to inertial forces.

Referring to FIG. 1, during operation, a molten flow of polymeric material is passed via the inlet conduit 13 into the inlet 12 of the housing 11 under pressure. The pressure is sufficient to force the polymeric material through the individual ducts 23 into the spaced apart points of the spiral groove 24. The individual streams of polymeric material then pass through the tubular filter 25 as indicated in FIG. 3 for distribution throughout the central cavity 18. In this respect, the tubular filter 25 is of a size to initially filter out relatively large anomalies in the polymeric material while smaller anomalies pass through while retaining the shattered metal in place. The polymer material then passes through the shattered metal particle mass 36 while accelerating prior to passage into and through the tubular filter elements 28. During passage through the shattered metal particle mass 36, micro gels can be filtered out. To this end, the shattered metal particles are sized to shear individual streams of the polymeric material into a multiplicity of branch streams for breaking down polymer gels in the individual steams. The polymeric material then passes into the individual tubular filter elements 28 wherein further filtering action takes place and thence passes through the branch ducts 34 and common duct to the outlet 14 as shown in FIG. 1.

By way of example, the following indicates the parameters of a prefilter assembly used for filtering a polymer (larger filters are simple expansions of this design):

| | |
|---|---|
| Flow Rate | 100 pounds/hour |
| Extruder Inlet Conduit (13) | 1.50 inches |
| Ducts (23) | 7 @ ⅜ inch diameter |
| Cavity (18) | 2 inch diameter |
| Filter (25) | Eltec filter media with support |
| Porous Filter Elements (28) | 7 @ 3/8" O.D. × .156" ID |
| Shattered Metal (36) | Metallurgical Industries, Inc. -P270 (a high chrome, high nickel metal) |

The prefilter assembly can be used for the filtering of various polymeric materials. In particular, the prefilter assembly may be used for the filtering of gel prone polymers which are used in the manufacture of high quality fiber and films, for example, for the manufacture of computer disk film, medical sutures and laminating films.

What is claimed is:

1. A prefilter assembly for molten polymeric material comprising:
   a housing having an inlet for receiving a flow of molten polymeric material, a cavity communicating with said inlet to receive the flow of polymeric material therefrom, and an outlet for expelling a filtered flow of polymeric material,
   a first filter in said housing between said inlet and said cavity to to initially filter the flow of polymeric material;
   a plurality of tubular porous metal filter elements mounted in said housing within said cavity to receive and filter polymeric material passing therethrough, each said tubular porous metal filter element having a closed end, an opposite open end in communication with said outlet and a passage between said open and closed ends for conveying filtered polymeric material to said open end; and a mass of shattered metal particles, retained by said first filter about said tubular porous metal filter elements and filling the remainder of said cavity, to filter micro-gels from the polymeric material passing therethrough prior to passage of the polymeric material into said tubular porous metal filter elements.

2. A prefilter assembly as set forth in claim 1 wherein said first filter is of tubular shape and is disposed centrally about said tubular porous filter elements.

3. A prefilter assembly as set forth in claim 1 wherein said housing includes a cylindrical wall defining said cavity, a spiral groove in said wall and a plurality of ducts communicating said inlet with a plurality of spaced apart points in said spiral groove to deliver polymeric material thereto.

4. A prefilter assembly as set forth in claim 1 wherein said inlet and said outlet are disposed in said housing to accommodate adjacent equipment.

5. A prefilter assembly as set forth in claim 1 wherein said housing includes a plurality of ducts communicating said inlet with a plurality of spaced apart points about said cavity for delivery of polymeric material thereinto.

6. A prefilter assembly as set forth in claim 1 wherein said mass of shattered metal particles occupies approximately 30% of the free volume of said cavity.

7. A prefilter assembly as set forth in claim 1 wherein said shattered metal particles are sized to shear individual streams of the polymeric material flowing therethrough into a multiplicity of branch streams for breaking down polymer gels in the individual streams.

8. In a filter assembly, the combination comprising a housing having a cavity for passage of a flow of molten polymeric material therethrough;

a plurality of tubular porous filter elements mounted within said cavity to receive and filter polymeric material passing therethrough; and a mass of shattered metal particles about said elements and filling the remainder of said cavity to filter micro-gels from the polymeric material passing therethrough prior to passage of the polymeric material into said porous filter elements.

9. The combination as set forth in claim 8 wherein said mass of shattered metal particles occupies approximately 30% of the free volume of said cavity.

10. The combination as set forth in claim 8 wherein said shattered metal particles are sized to shear individual streams of the polymeric material flowing therethrough into a multiplicity of branch streams for breaking down polymer gels in the individual streams.

11. The combination as set forth in claim 8 wherein said housing includes a cylindrical wall which defines said cavity, a spiral groove in said wall, an inlet to receive the polymeric material, and a plurality of ducts communicating said inlet with said spiral groove at a plurality of points thereof which are spaced apart therealong about said cavity for delivery of the polymeric material to said spiral groove.

* * * * *